(12) United States Patent
Huang

(10) Patent No.: US 8,164,924 B2
(45) Date of Patent: Apr. 24, 2012

(54) FRAME AND DISPLAY DEVICE WITH SAME

(75) Inventor: Hsieh-Ting Huang, Miao-Li County (TW)

(73) Assignee: Chimei Innolux Corporation, Miaoli County (TW)

( * ) Notice: Subject to any disclaimer, the term of this patent is extended or adjusted under 35 U.S.C. 154(b) by 185 days.

(21) Appl. No.: 12/718,072

(22) Filed: Mar. 5, 2010

(65) Prior Publication Data

US 2010/0238643 A1 Sep. 23, 2010

(30) Foreign Application Priority Data

Mar. 21, 2009 (CN) .......................... 2009 2 0301468

(51) Int. Cl.
*H02B 1/01* (2006.01)
(52) U.S. Cl. ......... 361/829; 361/807; 361/801; 361/802

(58) Field of Classification Search .................. 361/829, 361/801–807
See application file for complete search history.

(56) References Cited

U.S. PATENT DOCUMENTS 6,166,901 A * 12/2000 Gamble et al. ........... 361/679.34
6,894,739 B2 * 5/2005 Sung et al. ...................... 349/58
* cited by examiner

*Primary Examiner* — Yuriy Semenenko
*Assistant Examiner* — Andargie M Aychillhum
(74) *Attorney, Agent, or Firm* — WPAT., P.C.; Justin King

(57) ABSTRACT

A frame includes a main body, a sidewall extending substantially from an edge of the main body, and a position-limiting mechanism disposed at an inner surface of the sidewall. The position-limiting mechanism includes an elastic portion, an abutting portion extending from the elastic portion, and a stopping portion extending from the abutting portion. A gap is defined between the inner surface of the sidewall and the stopping portion when the elastic portion is in a relaxed state. A display device employing a frame is also provided.

19 Claims, 6 Drawing Sheets

FRAME AND DISPLAY DEVICE WITH SAME

BACKGROUND

1. Technical Field

The present disclosure generally relates to display technology, and particularly to a frame employed in a display device.

2. Description of Related Art

A typical display device, such as a liquid crystal display (LCD), often includes a display module, a bezel, and a rear frame attached to the bezel to accommodate the display module therebetween. Conventionally, a fixing element is disposed on a sidewall of one of the rear frame and the bezel to prevent the display module from shifting.

Referring to FIG. 6, a rear frame 10 of a conventional display device is shown. A plurality of ribs 11 is disposed on one of sidewalls (not labeled) of the rear frame 10. The ribs 11 can be in the form of projecting lugs. When a display module of the display device is received in the rear frame 10, the ribs 11 enable the rear frame 10 to fix the display module in position to a certain extent. Thus, the display module cannot be easily displaced or detached from the rear frame 10.

However, a manufacturer of a display device may obtain the display module from another, different manufacturer; and there may even be several different manufacturers all of whom supply display modules to the manufacturer of the display device. Even if the manufacturer of the display device uses only a single display module with the same specifications (i.e., the same model of display module), the display modules supplied by the different display module manufacturers may have different dimensions. That is, the size, length, width or thickness of the display modules used may differ according to the different display module manufacturers. Thus, the manufacturer of the display device may be required to make two or more different types of the rear frame 10 in order to match the different display modules. This typically requires two or more different molds for fabricating the rear frame 10. Thus, the cost of manufacturing the display device is high, and the development period for yielding the display devices off the production line may be prolonged.

What are needed, therefore, are a frame and a display device employing the frame, which can overcome the described limitations.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

Reference will now be made to the drawings to describe various embodiments in detail.

Figure 1:
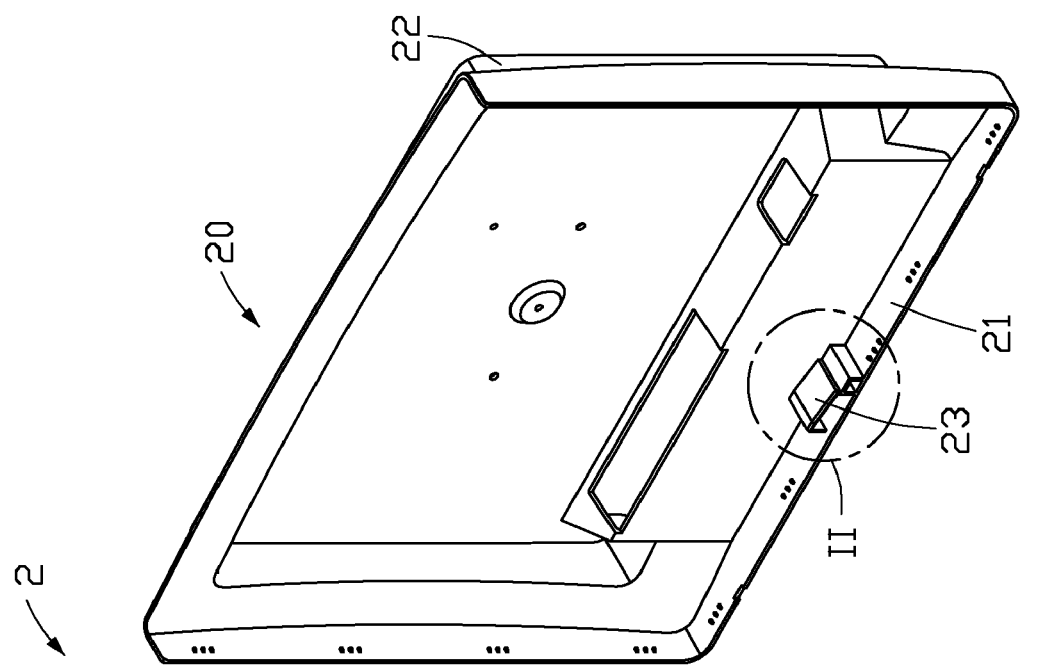
FIG. 1 is an isometric, exploded view of a first embodiment of a display device, the display device including a frame and a display module, the frame including a position-limiting mechanism.
Figure 1:
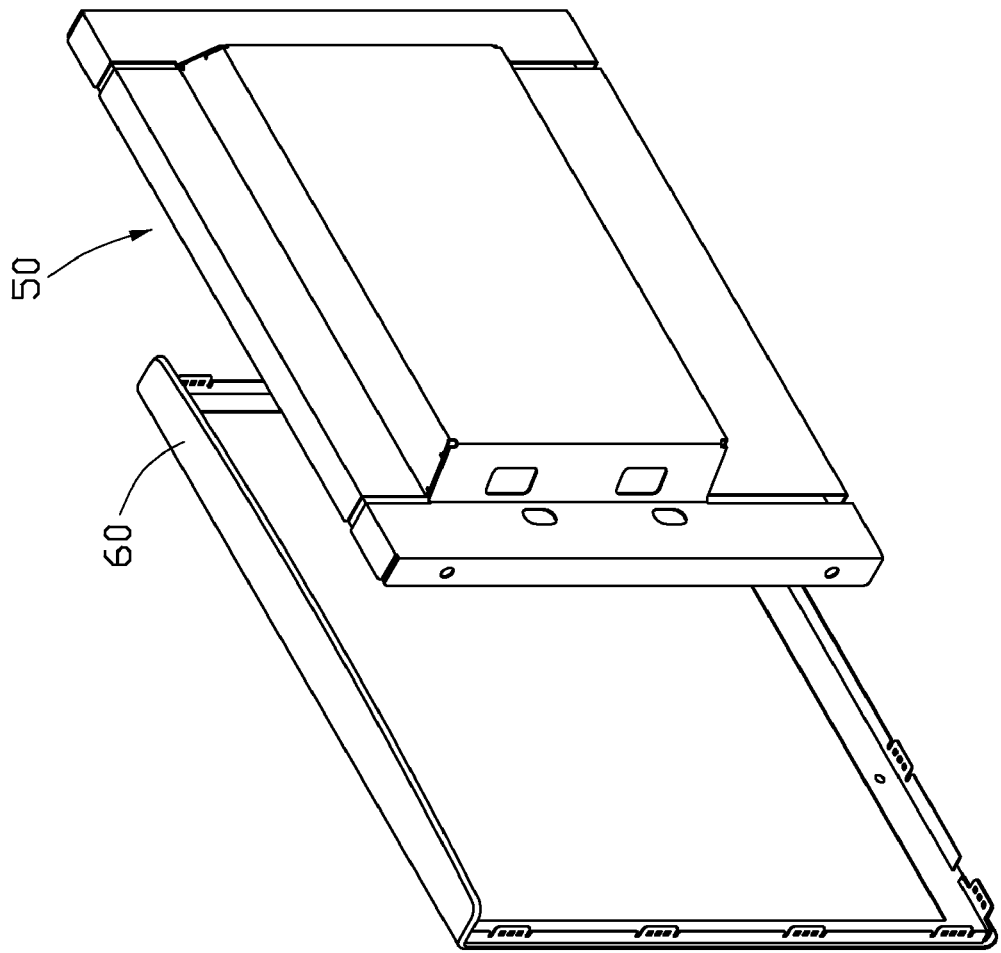

Referring to FIG. 1, an isometric, exploded view of a first embodiment of a display device 2 is shown. The display device 2 includes a first frame 20, a display module 50, and a second frame 60. The first frame 20 may be a rear frame, and the second frame 60 may be a bezel. The first frame 20 and the second frame 60 cooperatively receive and fix the display module 50 therebetween.

The first frame 20 includes a main body 22, an elongated sidewall 21 extending from a long edge of the main body 22, and a position-limiting mechanism 23 disposed at an inner surface (not labeled) of the first frame 20. The position-limiting mechanism 23 is formed on an inner surface of the sidewall 21 in this embodiment. In another embodiment, the position-limiting mechanism 23 may be formed on the main body 22, adjacent to the sidewall 21. In still another embodiment, the position-limiting mechanism 23 may be formed on both the sidewall 21 and the main body 22. The position-limiting mechanism 23 may be rubber or elastic resin.

Figure 2:
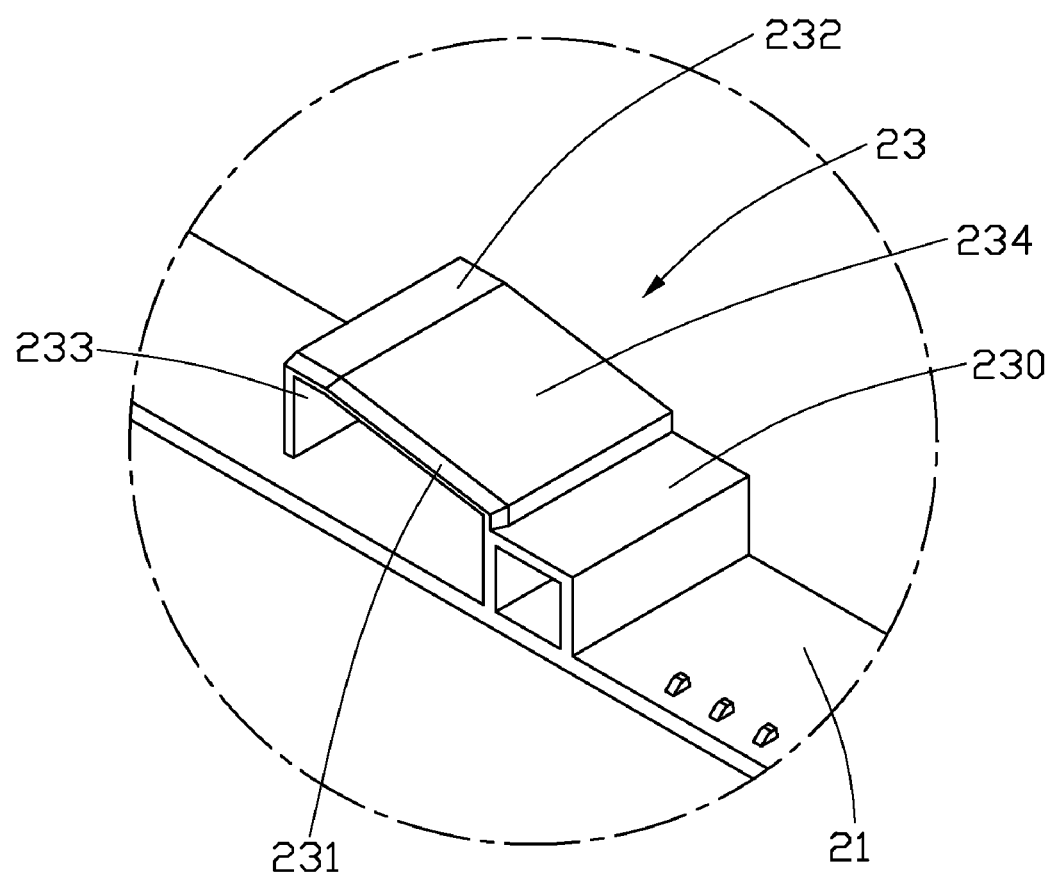
FIG. 2 is enlarged view of a circled portion II of FIG. 1.

Referring also to FIG. 2, the position-limiting mechanism 23 includes a supporting portion 230, an elastic portion 234, and an abutting portion 232. The supporting portion 230 upwardly extends from the inner surface of the sidewall 21. The supporting portion 230 includes at least two board sections. Two of such board sections meet at a supporting point, the supporting point being where the supporting portion 230 adjoins the elastic portion 234. The supporting point can be considered to be linear, and the two board sections extend from the linear supporting point along two different directions corresponding to two axes of a Cartesian coordinate system (not shown). In this embodiment, the supporting portion 230 and a part of the sidewall 21 cooperatively define a cuboid structure with an elongated through hole (not labeled). The through hole extends in a direction perpendicular to a direction along which the elongated sidewall 21 extends. The elastic portion 234 obliquely extends from the supporting portion 230, in a direction slightly upward from the horizontal. Thus the supporting portion 230 is located above the sidewall 21, and has a transverse width substantially the same as a transverse width of the sidewall 21. The elastic portion 234 can be formed integrally with the supporting portion 230. That is, the elastic portion 234 and the supporting portion 230 can be portions of a single, one-piece, monolithic body without any internal seams. The abutting portion 232 obliquely extends from an end of the elastic portion 234, in a direction slightly downward from the elastic portion 234. In this embodiment, the abutting portion 232 is oriented obliquely relative to the sidewall 21. An oblique angle of the abutting portion 232 relative to the sidewall 21 is less than an oblique angle of the elastic portion 234 relative to the sidewall 21.

Figure 3:
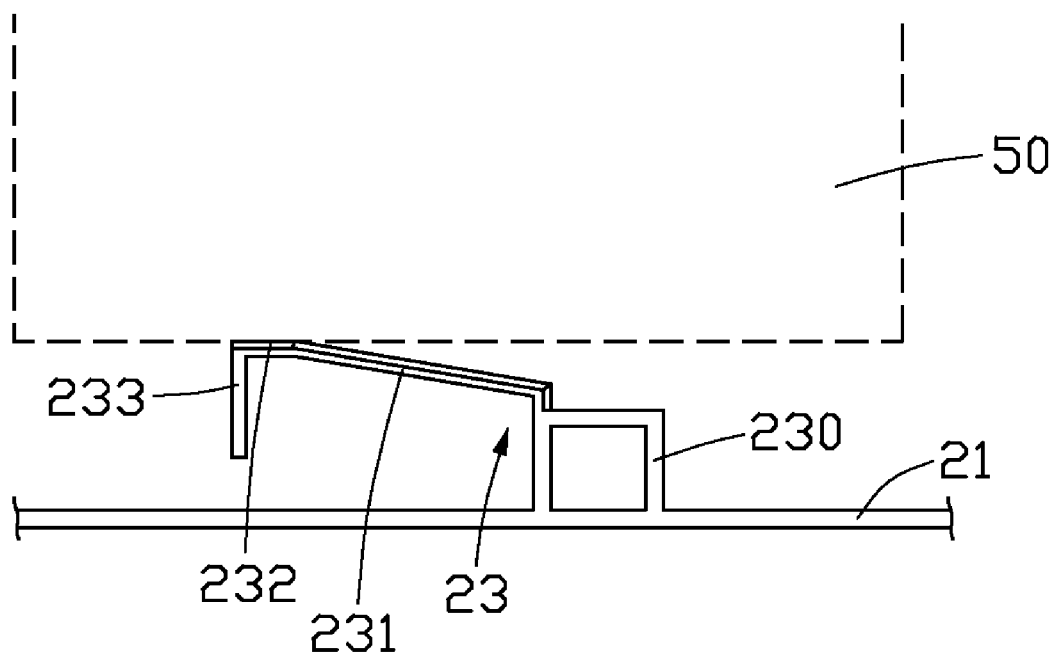
FIG. 3 is a front plan view of the position-limiting mechanism of the frame acting on the display module when the display device of FIG. 1 is assembled.

Referring also to FIG. 3, when the display module 50 is received in the first frame 20, the display module 50 abuts and presses the abutting portion 232. Accordingly, the elastic portion 234 deforms, and the abutting portion 232 moves toward the sidewall 21 and simultaneously generates a counteracting force pressing on the display module 50. Thus, any looseness that may otherwise exist due to size differences between the display module 50 and the first frame 20 is mitigated or even eliminated altogether.

The position-limiting mechanism 23 further includes a stopping portion 233 extending down from an end of the abutting portion 232 towards the sidewall 21. Thereby, a gap is defined between the inner surface of the sidewall 21 and a bottom end of the stopping portion 233 when the elastic portion 234 is relaxed. The stopping portion 233 prevents the elastic portion 234 from excessive deformation, by abutting the sidewall 21 at a predetermined limit of deformation of the elastic portion 234. Furthermore, the elastic portion 234 and the abutting portion 232 cooperatively define a sloped guide surface 231 on their lateral sides located away from the main body 22, thereby allowing the display module 50 to be easily received in the first frame 20 during assembly.

Figure 4:
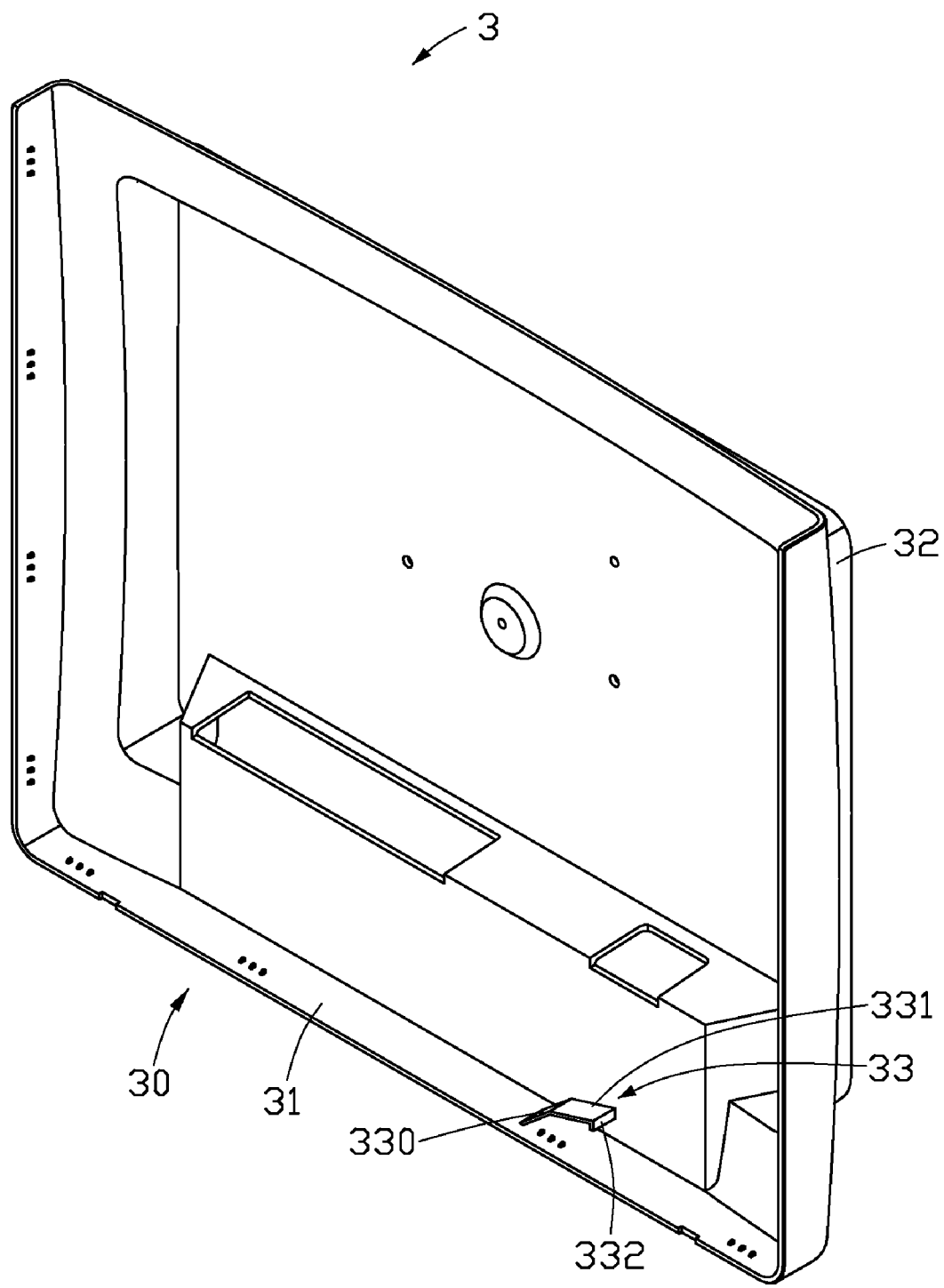
FIG. 4 is an isometric, exploded view of a frame of a second embodiment of a display device.

Referring to FIG. 4, this shows an isometric, exploded view of a first frame 30 of a second embodiment of a display device 3. The display device 3 is similar to the display device 2.

The first frame 30 includes a main body 32, a sidewall 31 extending from an edge of the main body 32, and a position-limiting mechanism 33 disposed at an inner surface (not labeled) of the sidewall 31. The position-limiting mechanism 33 includes an elastic portion 330 obliquely extending from the inner surface of the sidewall 31, and an abutting portion 331 obliquely extending from an end of the elastic portion 330. The sidewall 31 acts as a supporting portion for supporting the position-limiting mechanism 33. The elastic portion 330 extends from the sidewall 31 along a direction of a length of the sidewall 31. An oblique angle of the abutting portion 331 relative to the sidewall 31 is less than an oblique angle of the elastic portion 330 relative to the sidewall 31.

When the display module 50 is received in the first frame 30, the display module 50 abuts and presses the abutting portion 331. Accordingly, the elastic portion 330 deforms, and the abutting portion 331 moves toward the sidewall 31 and simultaneously generates a counteracting force pressing on the display module 50. Thus, any looseness that may otherwise exist due to size differences between the display module 50 and the first frame 30 is mitigated or even eliminated altogether.

The position-limiting mechanism 33 further includes a stopping portion 332 extending down from an end of the abutting portion 331 towards the sidewall 31. Thereby, a gap is defined between the inner surface of the sidewall 31 and a bottom end of the stopping portion 332 when the elastic portion 330 is relaxed. The stopping portion 332 prevents the elastic portion 330 from excessive deformation, by abutting the sidewall 31 at a predetermined limit of deformation of the elastic portion 330. Furthermore, the elastic portion 330 and the abutting portion 331 cooperatively define a sloped guide surface (not shown) on their lateral sides located away from the main body 32, thereby allowing the display module 50 to be easily received in the first frame 30 during assembly.

Figure 5:
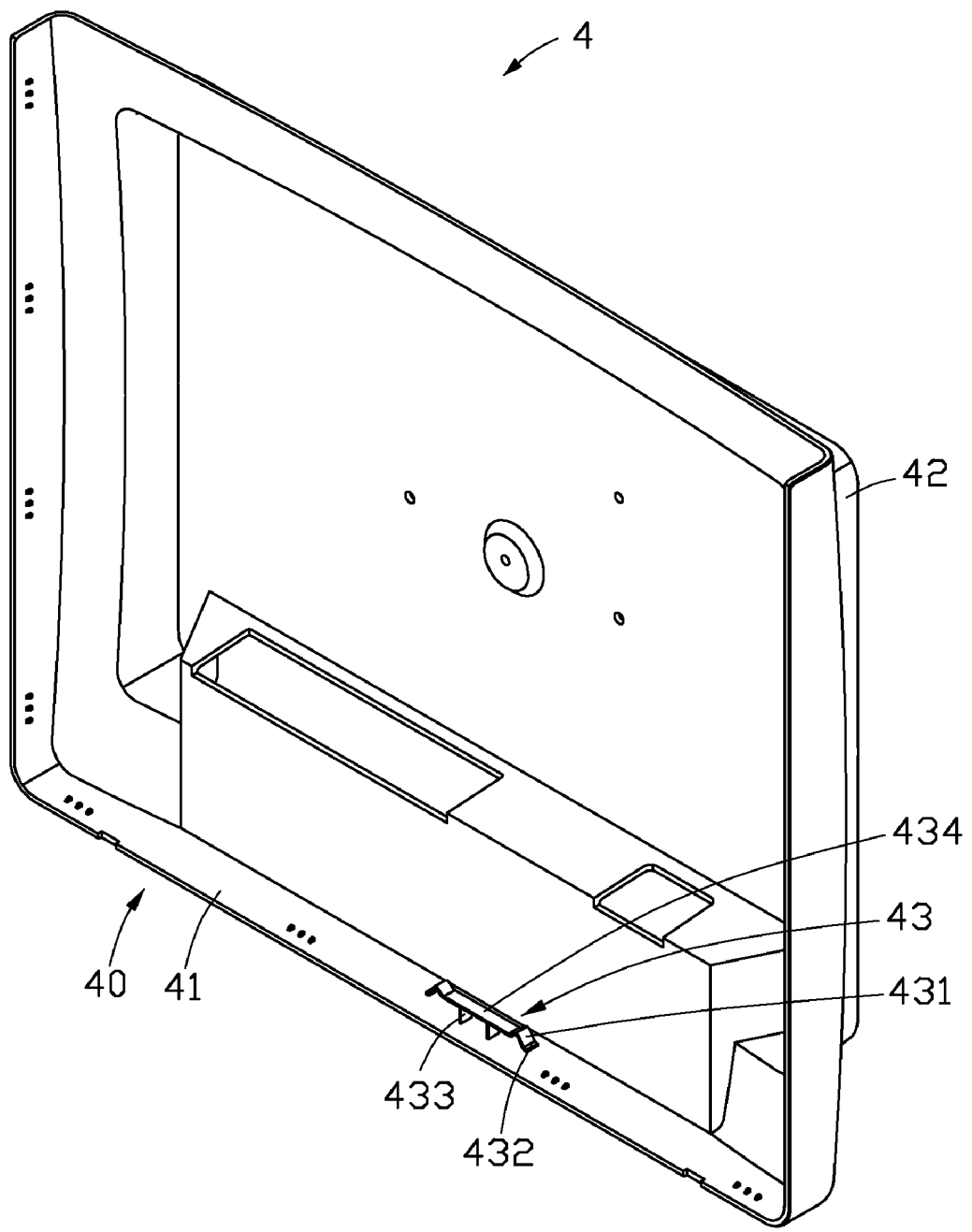
FIG. 5 is an isometric, exploded view of a frame of a third embodiment of a display device.
Figure 6:
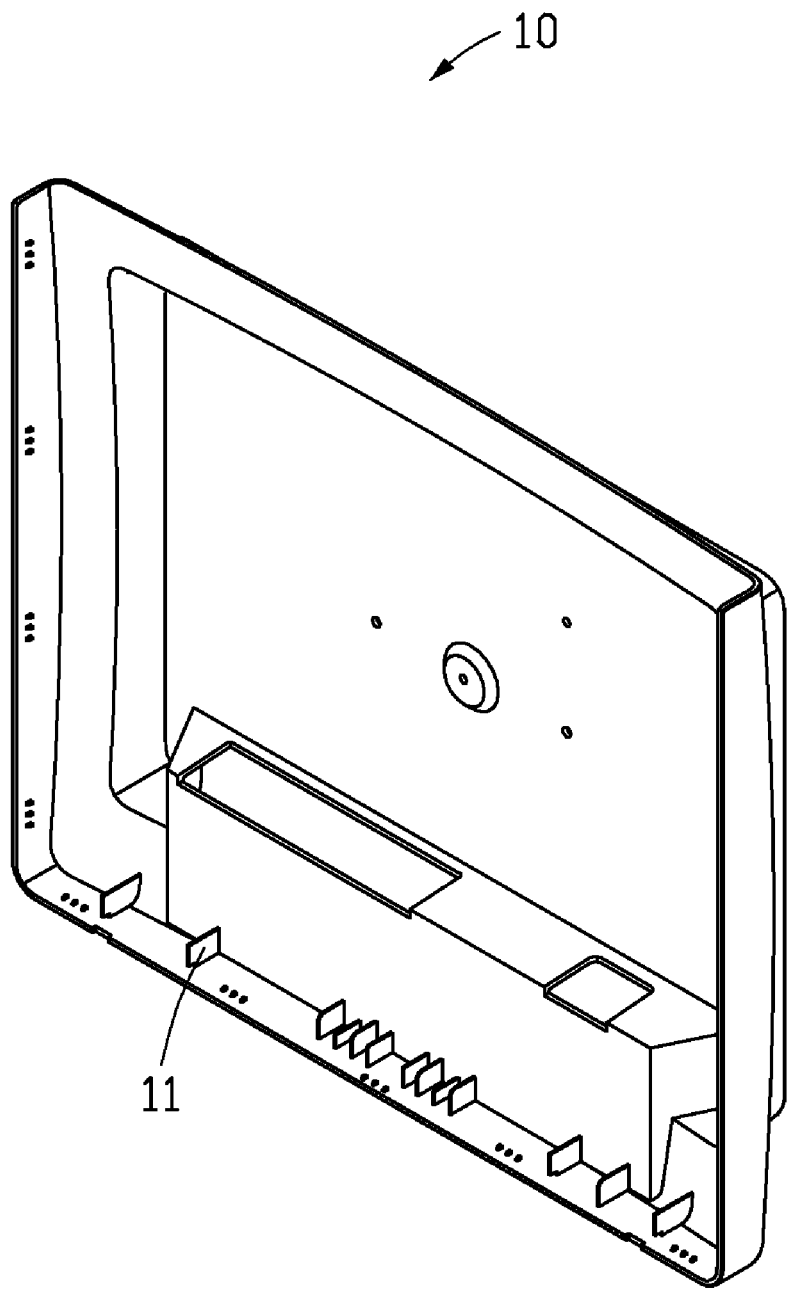
FIG. 6 is an isometric, exploded view of a rear frame commonly used in a conventional display device.

FIG. 5 is an isometric, exploded view of a first frame 40 of a third embodiment of a display device 4. The display device 4 is similar to the display device 2 and the display device 3.

The first frame 40 includes a main body 42, a sidewall 41 extending from an edge of the main body 42, and a position-limiting mechanism 43 disposed at an inner surface (not labeled) of the sidewall 41. The position-limiting mechanism 43 includes a supporting portion having two supporting legs 433, an elastic portion 434, and two abutting portions 431. The two supporting legs 433 are spaced apart a predetermined distance, and extend up from the sidewall 41. Top ends of the supporting legs 433 adjoin a center portion of the elastic portion 434. The elastic portion 434 is thus supported by the supporting legs 433, and is oriented parallel to the inner surface of the sidewall 41. The two abutting portions 431 are generally convex structures, respectively extending from two opposite ends of the elastic portion 434.

When the display module 50 is received in the first frame 40, the display module 50 abuts and presses the two abutting portions 431. Accordingly, the elastic portion 434 deforms, and the two abutting portions 431 move toward the sidewall 41 and simultaneously generate counteracting forces pressing on the display module 50. Thus, any looseness that may otherwise exist due to size differences between the display module 50 and the first frame 40 is mitigated or even eliminated altogether.

The position-limiting mechanism 43 further includes two stopping portions 432. The two stopping portions 432 respectively extend from bottom ends of the abutting portions 431, and are oriented approximately parallel to the sidewall 41. Thereby, a gap is defined between the inner surface of the sidewall 41 and a bottom of each stopping portion 432 when the corresponding elastic portion 434 is relaxed. The stopping portions 432 prevent the elastic portion 434 from excessive deformation, by abutting the sidewall 41 at a predetermined limit of deformation of the elastic portion 434.

In an alternative embodiment, the two supporting legs 433 may instead be a single supporting leg.

The position-limiting mechanisms 23, 33, 43 can be the same material as the sidewalls 21, 31, 41, respectively. All elements of the position-limiting mechanisms 23, 33, 43 can be integrally formed.

In summary, in each of the above-described embodiments, a position-limiting mechanism resiliently abuts the display module, restricting or preventing unwanted movement of the display module. Accordingly, in mass manufacturing, the one same first frame of the display device can match and fix display modules having slightly different sizes, with no need to make differently sized first frames. Further, the stopping portion(s) is configured so as to prevent excessive pressure being applied on the elastic portion, thereby preventing breakage of the elastic portion.

It is believed that the present embodiments and their advantages will be understood from the foregoing description, and it will be apparent that various changes may be made thereto without departing from the spirit and scope of the embodiments or sacrificing all of their material advantages.

What is claimed is:

1. A frame comprising:
   a main body;
   a sidewall extending substantially from an edge of the main body; and
   a position-limiting mechanism disposed at an inner surface of the sidewall;
   wherein the position-limiting mechanism comprises an elastic portion extending obliquely upwardly from the sidewall along a direction of a length of the sidewall, an abutting portion extending from the elastic portion, and a stopping portion extending from the abutting portion, a gap defined between the inner surface of the sidewall and the stopping portion when the elastic portion is in a relaxed state.

2. The frame of claim 1, wherein the position-limiting mechanism further comprises a supporting portion upwardly extending from the inner surface of the sidewall, and the supporting portion comprises at least two board sections meeting at a supporting point where the supporting portion adjoins the elastic portion, the at least two board sections extending from the supporting point along at least two different directions corresponding to two different axes of a Cartesian coordinate system.

3. The frame of claim 2, wherein the elastic portion extends obliquely upwardly from the supporting portion along the direction of the length of the sidewall.

4. The frame of claim 3, wherein the abutting portion extends obliquely from an end of the elastic portion along the direction of the length of the sidewall, in a direction slightly downward from the elastic portion.

5. The frame of claim 4, wherein an oblique angle of the abutting portion relative to the sidewall is less than an oblique angle of the elastic portion relative to the sidewall.

6. The frame of claim 5, wherein the elastic portion and the abutting portion cooperatively define a sloped guide surface on their lateral sides located away from the main body.

7. The frame of claim 2, wherein the supporting portion and a part of the sidewall cooperatively define a cuboid structure, which has an elongated through hole substantially perpendicular to the direction of the length of the sidewall.

8. The frame of claim 2, wherein the supporting portion comprises at least one supporting leg extending up from the sidewall.

9. The frame of claim 1, wherein the abutting portion extends obliquely from an end of the elastic portion along the direction of the length of the sidewall.

10. The frame of claim 9, wherein an oblique angle of the abutting portion relative to the sidewall is less than an oblique angle of the elastic portion relative to the sidewall.

11. The frame of claim 10, wherein the elastic portion and the abutting portion cooperatively define a sloped guide surface on their lateral sides located away from the main body.

12. A display device comprising:
a display module;
a first frame;
a second frame cooperating with the first frame to receive the display module therebetween; and
a position-limiting mechanism disposed at an inner surface of the first frame, the position-limiting mechanism comprising an elastic portion and an abutting portion, the abutting portion extending from one end of the elastic portion, the display module pressing the elastic portion, the elastic portion being elastically deformed such that the abutting portion applies a counteracting force pressing the display module;
wherein the abutting portion forms a first oblique angle with the inner surface of the first frame, the elastic portion forms a second oblique angle with the inner surface of the first frame, and the first oblique angle is less than the second oblique angle.

13. The display device of claim 12, wherein the position-limiting mechanism further comprises a stopping portion extending down from an end of the abutting portion towards the inner surface of the first frame, a gap defined between the stopping portion and the inner surface of the first frame when the elastic portion is relaxed.

14. The display device of claim 13, wherein the position-limiting mechanism further comprises a supporting portion between the inner surface of the first frame and the elastic portion.

15. The display device of claim 12, wherein the first frame comprises a main body and a sidewall extending substantially from an edge of the main body, the position-limiting mechanism disposed at a place selected from one of an inner surface of the sidewall, the main body adjacent to the sidewall, and both the sidewall and the main body.

16. A frame comprising:
a position-limiting mechanism disposed at an inner surface of the frame;
wherein the position-limiting mechanism comprises two supporting legs upwardly extending from the inner surface, an elastic portion supported by the two supporting legs, two abutting portions extending from two opposite ends of the elastic portion, and two stopping portions respectively extending from bottom ends of the two abutting portions, and a gap is defined between the inner surface and each stopping portion when the elastic portion is in a relaxed state; and
wherein the two supporting legs are spaced apart a predetermined distance, and top ends of the two supporting legs adjoin a center portion of the elastic portion such that the elastic portion is oriented approximately parallel to the inner surface when in the relaxed state.

17. The frame of claim 16, wherein the two abutting portions are generally convex structures.

18. The frame of claim 16, wherein the two stopping portions are oriented approximately parallel to the inner surface.

19. The frame of claim 16, further comprising a main body and a sidewall extending substantially from an edge of the main body, the position-limiting mechanism disposed at a place selected from one of an inner surface of the sidewall, the main body adjacent to the sidewall, and both the sidewall and the main body.

* * * * *